Patented Jan. 19, 1932

1,841,970

UNITED STATES PATENT OFFICE

KARL MIESCHER, OF BASEL, SWITZERLAND, ASSIGNOR TO SOCIETY OF CHEMICAL INDUSTRY IN BASLE, OF BASEL, SWITZERLAND

DERIVATIVES OF 4-QUINOLINE-CARBOXYLIC ACIDS

No Drawing. Application filed July 11, 1928, Serial No. 292,031, and in Switzerland July 15, 1927.

This invention relates to the manufacture of basic derivatives of substituted quinoline-carboxylic acids by causing a 2-oxyquinoline-carboxylic acid or a derivative thereof, substituted at the oxygen, or a 2-halogen-quinoline-carboxylic acid or a derivative or substitution product thereof, to react with an amino-alcohol or an ester or an alkali-compound thereof.

There is thus obtained, for example, by treating 2-ethoxy-4-quinoline-carboxylic acid-ethyl ester or 2-chloro-4-quinoline-carboxylic acid chloride with diethylamino-ethanol, the 2-ethoxy- or 2-chloro-4-quinoline-carboxylic acid-diethylamino-ethanol ester (Formulæ I and II). The same products may also be synthesized from the sodium salts of 2-ethoxy- or 2-chloro-4-quinoline-carboxylic acids and chloroethyldiethylamine.

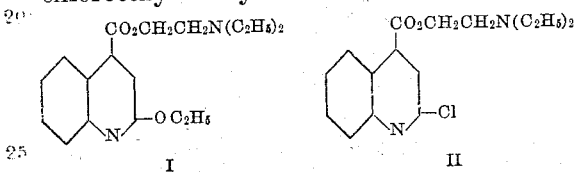

When an alcoholate is caused to act upon base II reaction occurs with elimination of halogen in the form of metal halide. For example, in the case of sodium diethyl-amino-ethanol there is obtained from the base II the 2-diethyl-amino-ethoxy-4-quinoline-carboxylic acid-diethylamino-ethanol ester (Formula III). In other cases an insomeric change occurs. Thus with sodium ethylate the base II yields preponderatingly the 2-diethylamino-ethoxy-4-quinoline-carboxylic acid-ethyl ester (Formula IV). The latter can also be obtained from 2-chloro-4-quinoline-carboxylic acid-ethyl ester and sodium diethylamino-ethanol.

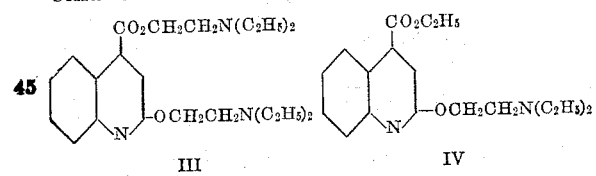

The new compounds have valuable therapeutic effects.

The following examples illustrate the invention, the parts being by weight:—

Example 1

1 part of 2-ethoxy-4-quinoline-carboxylic acid-ethyl ester is boiled with an excess of diethylamino-ethanol in an oil bath until no more alcohol distills. The diethylamino-ethanol which has not entered into reaction is distilled in a vacuum and the residue is taken up with ether, the new base extracted by means of dilute acid and then precipitated by means of sodium carbonate and extracted with ether. The 2-ethoxy-4-quinoline-carboxylic acid-diethylamino-ethanol ester is a yellowish oil of boiling point 134–136° C. at 0.02 mm. pressure. In acids and in organic solvents it is freely soluble but sparingly soluble in water. Its hydrochloric melts at 186° C. with decomposition. Its hydriodide at 157° C.

The ester may also be made from chloroethyldiethylamine and sodium 2-ethoxy-4-quinoline-carboxylate.

Example 2

1.2 part of diethylamino-ethanol is introduced, while cooling, into a solution of 2.3 parts of 2-chloro-4-quinoline-carboxylic acid chloride in toluene. The whole is heated in the water-bath and when the reaction is complete the hydrochloride of the new base is filtered. When recrystallized from alcohol it forms colorless crystals of melting point 175° C. By precipitating the aqueous solution of the hydrochloride by means of sodium carbonate the free 2-chloro-4-quinoline-carboxylic acid-diethylamino-ethanol ester is obtained in the form of a yellow oil, boiling at 140–145° C. at 0.01 mm. pressure.

The ester may also be made by the action of 2 molecular proportions of diethylamino-ethanol on 1 molecular proportion of the acid chloride, or by the action of chloroethyldiethylamine on sodium 2-chloro-4-quinoline-carboxylate.

Example 3

1 part of 2-chloro-4-quinoline-carboxylic acid diethylamino-ethanol ester (see Example 2) and 0.5 part of sodium diethylamino-ethanol are boiled in toluene in a reflux apparatus. The new base is extracted by means of acid, precipitated from the acid solution by means of sodium carbonate and isolated in the usual manner. It is 2-diethylamino-ethoxy-4-quinoline-carboxylic acid-diethylamino-ethanol ester and is a bright yellow oil boiling at 170° C. at 0.01 mm. pressure. It is freely soluble in dilute acids and in organic solvents. Its colorless hydrochloride melts at 217° C. and dissolves freely in water and sparingly in acetone.

The dibasic ester can be made directly from 1 molecular proportion of 2-chloro-4-quinoline-carboxylic acid chloride and 2 molecular proportions of sodium diethylaminoethanol.

*Example 4*

30 parts of 2-chloro-4-quinoline-carboxylic acid-diethylamino-ethanol ester (see Example 2) are heated with 7 parts of sodium ethylate in toluene on the water-bath, while stirring. When the reaction is complete, the toluene solution is washed with water and extracted by means of acid. For separating from the secondarily formed di-base (Example 3) the neutral aqueous solution may be precipitated for example by means of potassium iodide. The hydriodide of the 2-diethylamino-ethoxy-4-quinoline-carboxylic acid-ethyl esther thus formed is purified by recrystallization from water; it melts at 143° C. The free base forms bright yellow crystals of melting point 36° C. It boils at 135–140° C. under 0.015 mm. pressure. It is freely soluble in dilute acids and in all organic solvents, but sparingly soluble in water. Its hydrochloride is colorless and melts at 162° C.

The base is also produced for example from 2-chloro-4-quinoline-carboxylic acid - ethyl ester and sodium diethylamino-ethanol according to Example 3.

In analogous manner there may also be made (1) according to Example 1:

2-methoxy-4-quinoline-carboxylic acid-diethylamino-ethanol ester, an oil boiling at 138–140° C., under 0.02 mm. pressure. Its hydiodide melts at 142° C.

2-n-propyloxy-4-quinoline-carboxylic acid-diethylamino-ethanol ester, a yellowish oil boiling at 146° C., under 0.03 mm. pressure.

2-n-butyloxy-4-quinoline-carboxylic acid-diethylamino-ethanol ester, a yellowish oil boiling at 160° C. under 0.02 mm. pressure. Its hydriodide melts at 106° C.

2-isoamyloxy-4-quinoline-carboxylic acid-diethylamino-ethanol ester, a yellowish oil boiling at 158° C., under 0.02 mm. pressure.

2-cyclohexyloxy - 4 - quinoline - carboxylic acid-diethylamino-ethanol ester, colorless crystals of melting point 110–111° C. after recrystallization from petroleum ether.

(2) According to Examples 3 and 4 from 2-chloro-4-quinoline-carboxylic acid-diethylamino-ethanol ester the following compounds:

| Alcoholate used | Properties— | |
|---|---|---|
| | Of the bases | Of the salts |
| Methyl-alcoholate | Nearly colorless crystals of melting point 23° C. | Hydriodide melting point 133° C. |
| N-propyl-alcoholate | Oil of boiling point 154° C. under 0.025 mm. pressure. | Hydrochloride melting point 138° C. |
| Allyl-alcoholate | Oil | Hydriodide melting point 134° C. |
| Isoamyl-alcoholate | Oil of boiling point 165–170° C. under 0.05 mm. pressure. | Hydriodide melting point 124° C. |
| N-heptyl-alcoholate | Oil of boiling point 172–175° C. under 0.01 mm. pressure | |
| N-cotyl-alcoholate | Nearly colorless crystals of melting point 35° C., boiling point 180 to 182° C. under 0.03 mm. pressure | |
| Cyclohexyl-alcoholate | Nearly colorless crystals of melting point 41° C. | Hydriodide melting point 146° C. |
| Benzyl-alcoholate | Oil of boiling point 210–215° C. under 0.001 mm. pressure | Hydriodide melting point 105° C. |

The esterification and etherification can be performed in any of the usual manners.

What I claim is:—

1. As new products basic derivatives of substituted 4-quinoline-carboxylic acids of the general formula

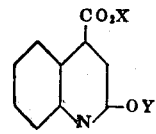

wherein one of the letters X and Y means alkyl, alkalene, phenylalkyl or hydrophenyl and the other means

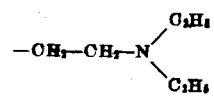

which products form salts soluble in water and alcohol and have valuable therapeutic effects.

2. As new products diethylamino-ethanol esters of 4-quinolinecarboxylic acids of the general formula

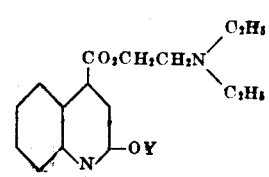

Y meaning alkyl or hydrophenyl, which products form salts soluble in water and alcohol and have valuable therapeutic effects.

3. As new products diethylamino-ethanol esters of 4-quinolinecarboxylic acids of the general formula

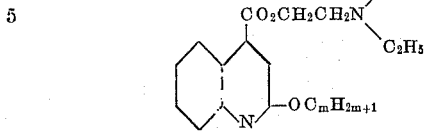

m meaning a whole number, which products form salts soluble in water and alcohol and have valuable therapeutic effects.

4. As a new product 2-ethoxy-4-quinoline-carboxylic acid-diethylamino-ethanol ester of the formula

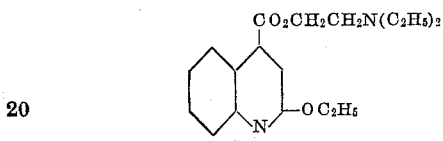

which forms a yellowish oil of boiling point 134–136° C. at 0.02 mm. pressure and is easily soluble in organic solvents and in acids, its hydrochloride melting at 186° C., said product being useful in therapeutics.

5. As new products esters of 2-diethyl-amino-ethoxy-4-quinoline-carboxylic acids of the general formula

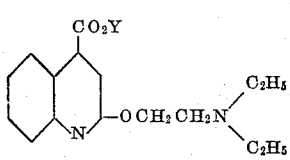

Y meaning alkyl, alkylene, phenylalkyl or hydrophenyl, which products form salts soluble in water and alcohol and have valuable therapeutic effects.

6. As new products esters of 2-diethylamino-ethoxy-4-quinoline-carboxylic acids of the general formula

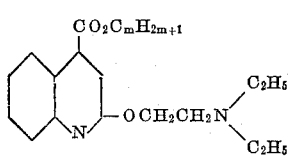

m meaning a whole number, which products form salts soluble in water and alcohol and have valuable therapeutic effects.

7. As a new product 2-diethylamino-ethoxy-4-quinoline-carboxylic acid-ethyl ester of the formula

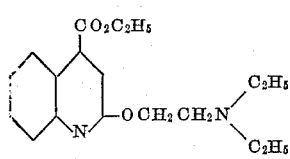

which forms bright yellow crystals of melting point 36° C. and of boiling point 135–140° C. at 0.015 mm. pressure, and is easily soluble in organic solvents and in acids, its hydro-iodide melting at 143° C., said product being useful in therapeutics.

In witness whereof I have hereunto signed my name to this 27th day of June 1928.

KARL MIESCHER.